(12) United States Patent
Lee et al.

(10) Patent No.: US 9,685,785 B2
(45) Date of Patent: Jun. 20, 2017

(54) POWER DELIVERY OVER DIGITAL INTERACTION INTERFACE FOR VIDEO AND AUDIO (DIIVA)

(71) Applicant: Lattice Semiconductor Corporation, Portland, OR (US)

(72) Inventors: Dongyun Lee, Sunnyvale, CA (US); Edward Pak, Saratoga, CA (US); John Hahn, Los Altos, CA (US); Mayank Gupta, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 93 days.

(21) Appl. No.: 14/181,446

(22) Filed: Feb. 14, 2014

(65) Prior Publication Data

US 2014/0159477 A1    Jun. 12, 2014

Related U.S. Application Data

(62) Division of application No. 12/636,063, filed on Dec. 11, 2009, now Pat. No. 8,680,712.

(Continued)

(51) Int. Cl.
*G06F 13/14* (2006.01)
*H02J 3/02* (2006.01)
(Continued)

(52) U.S. Cl.
CPC ............ *H02J 3/02* (2013.01); *G06F 13/14* (2013.01); *H04L 12/10* (2013.01);
(Continued)

(58) Field of Classification Search
USPC ............ 710/105, 106, 110, 305; 307/42, 54; 713/340, 300
See application file for complete search history.

(56) References Cited

U.S. PATENT DOCUMENTS 4,575,714 A    3/1986 Rummel
5,148,144 A *  9/1992 Sutterlin et al. .............. 455/402
(Continued)

FOREIGN PATENT DOCUMENTS

CN    1604562 A    4/2005
CN    1655132 A    8/2005
(Continued)

OTHER PUBLICATIONS

Differential Signaling, <http://en.wikipedia.org/wiki/Differential_signaling>, accessed Oct. 8, 2014.*
(Continued)

*Primary Examiner* — Khanh Dang
(74) *Attorney, Agent, or Firm* — Fenwick & West LLP

(57) ABSTRACT

A system for delivering power over a network of devices connected through a serial link includes a first and second differential pairs of wires. Each differential pair of wires is double AC coupled by a HPF on one side and by another HPF on an opposite side. An LPF connects a portion of each differential pair of wires between the HPFs to a voltage source, and another LPF connects that portion of each differential pair to a load. The system further includes a third and fourth differential pairs of wires. All four differential pairs of wires are located within a single cable, such as a CAT6 cable. The first, second and third differential pair of wires are used for video links, and the fourth differential pair of wires are used for the bi-directional hybrid link. A power delivery circuit in each device includes a voltage source, a power relay switch, a signature resistor for detection, and a load detector.

6 Claims, 7 Drawing Sheets

Related U.S. Application Data

(60) Provisional application No. 61/201,727, filed on Dec. 11, 2008.

(51) Int. Cl.
*H04L 12/10* (2006.01)
*H04L 12/40* (2006.01)
*H04N 21/436* (2011.01)
*H04L 12/28* (2006.01)
*H04N 5/63* (2006.01)
*H04N 7/10* (2006.01)

(52) U.S. Cl.
CPC ..... *H04L 12/40045* (2013.01); *H04N 21/436* (2013.01); *H04L 2012/2849* (2013.01); *H04N 5/63* (2013.01); *H04N 7/108* (2013.01); *Y10T 307/492* (2015.04); *Y10T 307/56* (2015.04)

(56) References Cited

U.S. PATENT DOCUMENTS

| | | | |
|---|---|---|---|
| 5,428,752 A | 6/1995 | Goren et al. | |
| 5,541,957 A * | 7/1996 | Lau | 375/258 |
| 5,783,926 A | 7/1998 | Moon et al. | |
| 5,983,288 A | 11/1999 | Visee | |
| 6,144,399 A * | 11/2000 | Manchester et al. | 725/127 |
| 6,339,831 B1 | 1/2002 | Sugawara et al. | |
| 6,526,516 B1 | 2/2003 | Ishikawa et al. | |
| 6,567,007 B1 | 5/2003 | Fritsche et al. | |
| 6,789,208 B2 | 9/2004 | Noda et al. | |
| 6,836,546 B1 * | 12/2004 | Willer | 379/399.01 |
| 6,914,637 B1 | 7/2005 | Wolf et al. | |
| 7,142,094 B1 | 11/2006 | Davidow et al. | |
| 7,254,734 B2 * | 8/2007 | Lehr et al. | 713/340 |
| 7,295,578 B1 | 11/2007 | Lyle et al. | |
| 7,373,528 B2 | 5/2008 | Schindler | |
| 7,502,878 B1 | 3/2009 | Wright | |
| 7,548,799 B2 | 6/2009 | Landry et al. | |
| 7,639,765 B2 | 12/2009 | Suzuki et al. | |
| 7,856,561 B2 | 12/2010 | Stineman et al. | |
| 7,916,780 B2 | 3/2011 | Lee | |
| 7,936,546 B2 | 5/2011 | Vorenkamp et al. | |
| 7,940,809 B2 * | 5/2011 | Lee | 370/525 |
| 7,958,286 B2 | 6/2011 | Bresemann et al. | |
| 8,122,159 B2 | 2/2012 | Monreal | |
| 8,159,927 B2 * | 4/2012 | Shakiba et al. | 370/201 |
| 8,355,327 B2 | 1/2013 | Lida et al. | |
| 8,509,321 B2 * | 8/2013 | Alon et al. | 375/260 |
| 8,635,473 B2 * | 1/2014 | Karam et al. | 713/310 |
| 8,659,986 B1 * | 2/2014 | Martinson et al. | 370/201 |
| 8,787,562 B2 * | 7/2014 | Binder et al. | 379/413 |
| 8,799,537 B1 | 8/2014 | Zhu et al. | |
| 2002/0144165 A1 | 10/2002 | Wright et al. | |
| 2002/0171741 A1 | 11/2002 | Tonkin et al. | |
| 2003/0035049 A1 | 2/2003 | Dickens et al. | |
| 2003/0048852 A1 | 3/2003 | Hwang et al. | |
| 2004/0073697 A1 | 4/2004 | Saito et al. | |
| 2004/0177197 A1 | 9/2004 | McLeod | |
| 2004/0203296 A1 | 10/2004 | Moreton et al. | |
| 2004/0267974 A1 | 12/2004 | Dunstan | |
| 2005/0004708 A1 | 1/2005 | Goldenberg et al. | |
| 2005/0018596 A1 * | 1/2005 | Washburn et al. | 370/201 |
| 2005/0080935 A1 | 4/2005 | Fukae et al. | |
| 2005/0132109 A1 | 6/2005 | Steger | |
| 2005/0144345 A1 | 6/2005 | Nakano | |
| 2006/0026651 A1 | 2/2006 | Kwon et al. | |
| 2006/0031895 A1 | 2/2006 | Kwon et al. | |
| 2006/0085627 A1 | 4/2006 | Noorbakhsh | |
| 2006/0100799 A1 | 5/2006 | Karam | |
| 2006/0164098 A1 | 7/2006 | Su | |
| 2006/0209892 A1 | 9/2006 | MacMullan et al. | |
| 2006/0210057 A1 | 9/2006 | Stanford | |
| 2007/0011375 A1 | 1/2007 | Kumar | |
| 2007/0076340 A1 | 4/2007 | Ewing et al. | |
| 2007/0165345 A1 | 7/2007 | Woo | |
| 2007/0200859 A1 | 8/2007 | Banks et al. | |
| 2007/0201546 A1 | 8/2007 | Lee | |
| 2007/0257923 A1 | 11/2007 | Whitby-Strevens | |
| 2008/0005433 A1 | 1/2008 | Diab et al. | |
| 2008/0008470 A1 | 1/2008 | Lin et al. | |
| 2008/0028120 A1 | 1/2008 | McLeod | |
| 2008/0049104 A1 | 2/2008 | Chang | |
| 2008/0122556 A1 | 5/2008 | Oshima et al. | |
| 2008/0129882 A1 | 6/2008 | Moriyama | |
| 2008/0150718 A1 | 6/2008 | Apfel | |
| 2008/0278981 A1 | 11/2008 | Hachiya | |
| 2008/0293365 A1 | 11/2008 | Sim et al. | |
| 2008/0301748 A1 | 12/2008 | Lida et al. | |
| 2008/0317181 A1 | 12/2008 | Suzuki et al. | |
| 2009/0013366 A1 | 1/2009 | You et al. | |
| 2009/0088908 A1 | 4/2009 | Karam | |
| 2009/0141180 A1 | 6/2009 | Kondo et al. | |
| 2009/0147864 A1 | 6/2009 | Lida et al. | |
| 2009/0157885 A1 | 6/2009 | Takatsuji et al. | |
| 2009/0177818 A1 | 7/2009 | Shim et al. | |
| 2009/0177820 A1 | 7/2009 | Ranade et al. | |
| 2009/0245345 A1 | 10/2009 | Lee et al. | |
| 2009/0260043 A1 | 10/2009 | Tatsuta et al. | |
| 2009/0296731 A1 | 12/2009 | Lida et al. | |
| 2010/0073574 A1 | 3/2010 | Nakajima et al. | |
| 2010/0085482 A1 | 4/2010 | Toba et al. | |
| 2010/0100200 A1 | 4/2010 | Kim et al. | |
| 2010/0132001 A1 | 5/2010 | Kitano et al. | |
| 2010/0142723 A1 | 6/2010 | Bucklen | |
| 2010/0165912 A1 | 7/2010 | Funabiki et al. | |
| 2010/0283324 A1 | 11/2010 | Lee et al. | |
| 2011/0019623 A1 | 1/2011 | Funabiki et al. | |
| 2012/0203937 A1 | 8/2012 | Mohanty et al. | |
| 2014/0115110 A1 | 4/2014 | Altmann | |

FOREIGN PATENT DOCUMENTS

| | | |
|---|---|---|
| CN | 101032113 | 9/2007 |
| CN | 101211164 A | 7/2008 |
| CN | 101304216 A | 11/2008 |
| CN | 101316043 A | 12/2008 |
| CN | 101436871 A | 5/2009 |
| EP | 0166441 | 1/1986 |
| EP | 1473941 | 3/2004 |
| JP | 11-112524 A | 4/1999 |
| JP | 2003-111058 A | 4/2003 |
| JP | 2004-350266 A | 12/2004 |
| JP | 2005-051741 A | 2/2005 |
| JP | 2005-129010 A | 5/2005 |
| JP | 2005-173553 A | 6/2005 |
| JP | 2005-217799 A | 8/2005 |
| JP | 2007-134803 A | 5/2007 |
| JP | 2008-017438 A | 1/2008 |
| JP | 2008-054327 A | 3/2008 |
| JP | 2008-529463 A | 7/2008 |
| JP | 2008-252310 A | 10/2008 |
| JP | 2008-310300 A | 12/2008 |
| JP | 2009-124705 A | 6/2009 |
| JP | 2011-540936 | 5/2012 |
| KR | 10-2005-0012310 | 2/2005 |
| TW | 200303711 A | 9/2003 |
| TW | 200843279 A | 11/2008 |

OTHER PUBLICATIONS

High-pass filter, <http://en.wikipedia.org/wiki/High-pass_filter>, accessed Oct. 8, 2014.*
Introduction to DiiVA, DiiVA Consortium, 2010.
"Electrical Transient Immunity for Power-Over-Ethernet," Application Report, SLVA233A, Texas Instruments, Apr. 2006, Revised Aug. 2006, 20 pages.
Digital Visual Interface DVI Revision 1.0, Digital Display Working Group, Apr. 2, 1999, 76 pages.
DisplayPort Ver. 1.2 Overview, DisplayPort Developer Conference, Taipei, Dec. 6, 2010, 33 pages.
High-Definition Multimedia Interface Specification Version 1.3, HDMI Licensing, LLC, Jun. 22, 2006, 237 pages.

(56) References Cited

OTHER PUBLICATIONS

"Introduction to DiiVA Designed Specifically for Home Entertainment Networking," DiiVA Licensing LLC, 2010, 4 pages.
Decision on Rejection dated Feb. 5, 2013 (+ English translation), in Chinese Patent Application No. 200980100976.3, 16 pages.
DiiVA Specification 1.1 Draft A, DiiVA Promoters Group, distribution date Jan. 7, 2010, 188 pages.
International Search Report and Written Opinion of the International Searching Authority dated Jun. 29, 2010, in International Patent Application No. PCT/US2009/067744, 10 pages.
International Search Report and Written Opinion of the International Searching Authority dated Nov. 24, 2009, in International Patent Application No. PCT/US2009/038077, 7 pages.
International Search Report and Written Opinion of the International Searching Authority dated Sep. 27, 2011, in International Patent Application No. PCT/US11/21031.
Microprocessor and Microcomputer Standards Committee of the IEEE Computer Society, "IEEE P1394r Draft 1 Draft Standard for High Performance Serial Bus", 2007.
Office Action dated Jan. 31, 2012 (+ English translation), in Chinese Patent Application No. 200980100976.3, 21 pages.
Office Action dated Jul. 24, 2013 (+ English translation), in Taiwan Patent Application No. 098142426, 12 pages.
Office Action dated Jul. 31, 2012 (+ English translation), in Taiwan Patent Application No. 098110096, 35 pages.
Office Action dated Mar. 30, 2012 (+ English translation), in Chinese Patent Application No. 200980105447.2, 16 pages.
Office Action dated Nov. 29, 2012 (+ English translation), in Chinese Patent Application No. 200980105447.2, 8 pages.
Office Action dated Sep. 13, 2012 (+ English translation), in Chinese Patent Application No. 200980100976.3, 21 pages.
Office Action for Patent Application No. 2011-501975, (Aug. 5, 2013).
Japanese Office Action, Japanese Application No. 2011-540936, Jan. 6, 2014 (with concise explanation of relevance).
Taiwan Office Action, Taiwan Application No. 098142426, Dec. 23, 2013, 12 pages.
United States Office Action, U.S. Appl. No. 12/636,063, Feb. 1, 2013, 9 pages.
Japanese Office Action, Japanese Application No. 2011-540936, Jun. 3, 2014, 4 pages.
Chinese First Office Action, Chinese Application No. 201180005935.3, Aug. 27, 2014, 14 pages.
Japanese Office Action, Japanese Application No. 2012-549056, Jul. 8, 2014, 5 pages (with English Summary).
Japanese Office Action, Japanese Application No. 2014-204129, Aug. 18, 2015, 5 pages (with English summary).
Anonymous: "HDMI 1.4: HDMI Ethernet Channel," Nov. 26, 2009, pp. 1-3, [Online] [Retrieved on Jan. 30, 2015] Retrieved from the Internet<URL:https://web.archive.org/web/20091126015121/http://www.hdmi.org/manufacturer/hdmi_1_4/hec.aspx>.
European Examination Report, European Application No. 11733339.3, Feb. 11, 2015, 5 pages.
Korean Office Action, Korean Application No. 10-2010-7024163, Jan. 30, 2015, 12 pages.
Chinese Second Office Action, Chinese Application No. 201180005935.3, May 5, 2015, 17 pages.
Japanese Office Action, Japanese Application No. 2011-540936, Jul. 14, 2015, 5 pages (with English summary).
Korean Office Action, Korean Application No. 10-2010-7024163, Jul. 28, 2015, 5 pages.
Chinese Third Office Action, Chinese Application No. 2011/0005935.3, Nov. 18, 2015, 10 pages.
Korean Office Action, Korean Application No. 10-2011-7015915, Nov. 9, 2015, 7 pages.
European Summons to Attend Oral Proceedings Pursuant to Rule 115(1) EPC, Dec. 3, 2015, 5 pages.
Chinese Fourth Office Action, Chinese Application No. 201180005935.3, Jun. 24, 2016, 7 pages.
Chinese Second Office Action, Chinese Application No. 201310368413.0, Aug. 23, 2016, 9 pages.
Chinese First Office Action, Chinese Application No. 201310368413.0, Dec. 30, 2015, 16 pages.

* cited by examiner

POWER DELIVERY OVER DIGITAL INTERACTION INTERFACE FOR VIDEO AND AUDIO (DIIVA)

CROSS-REFERENCE TO RELATED APPLICATIONS

The present application is a divisional of U.S. application Ser. No. 12/636,063 the "'063 application"), filed on Dec. 11, 2009 and entitled "Power Delivery Over Digital Interactive Interface for Video and Audio (DiiVA)," which is based upon, and claims the benefit of priority under 35 U.S.C. §119, to U.S. Provisional Patent Application No. 61/201,727 (the "'727 provisional application"), filed Dec. 11, 2008 and entitled "Power Delivery Over Digital Interactive Interface for Video and Audio (DiiVA)." The content of both the '063 application and the '717 provisional application are incorporated by reference in their entirety as though fully set forth herein.

BACKGROUND

DiiVA (Digital Interactive Interface For Video And Audio) is a bi-directional audio/video interface that allows uncompressed high-definition video, as well as multi-channel audio, high-bandwidth, and bi-directional data to be transferred over a single cable. DiiVA implements a bi-directional hybrid data channel capable of transporting user data, including but not limited to audio data, control data, Ethernet data, and bulk data. DiiVA allows users to connect, configure and control a plurality of consumer electronic devices (including without limitation DVD players, digital video recorders, set top boxes, personal computers, camcorders, cameras, and home stereo systems, just by way of example) from their digital TV or other DiiVA node.

Methods and systems are needed for reliably delivering power over DiiVA.

SUMMARY

A system for delivering power over a network of devices connected through a serial link includes a first differential pair of wires and a second differential pair of wires. The first differential pair of wires is double AC coupled by a first HPF (high pass filter) on one side and by a second HPF on an opposite side. The second differential pair of wires is double AC coupled by a third HPF on one side and by a fourth HPF on an opposite side. A first LPF (low pass filter) connects a portion of the first differential pair of wires between the first HPF and the second HPF to a voltage source. A second LPF connects the portion of the first differential pair of wires to a load. The system further includes a third differential pair of wires and a fourth differential pair of wires. All four differential pairs of wires are located within a single cable, such as a CAT6 cable. The first, second and third differential pair of wires are used for video links, and the fourth differential pair of wires are used for a bi-directional hybrid link.

A power delivery circuit configured to deliver power to one or more of a plurality of devices connected in a network includes a voltage source, and a power relay switch which can close to relay the voltage generated by the voltage source to the devices in the network. The circuit further includes a signature resistor for power source detection from one of the connected devices. A load detector is connected to the switch and reads a load current flowing therethrough in order to detect a load in a connected device and extract information about the connected device based on the load current.

BRIEF DESCRIPTION OF THE DRAWINGS

The drawings disclose illustrative embodiments. They do not set forth all embodiments. Other embodiments may be used in addition or instead. When the same numeral appears in different drawings, it is intended to refer to the same or like components or steps.

DESCRIPTION

In the present disclosure, methods and systems are disclosed for delivering power over DiiVA. Illustrative embodiments are discussed. Other embodiments may be used in addition or instead.

Figure 1:
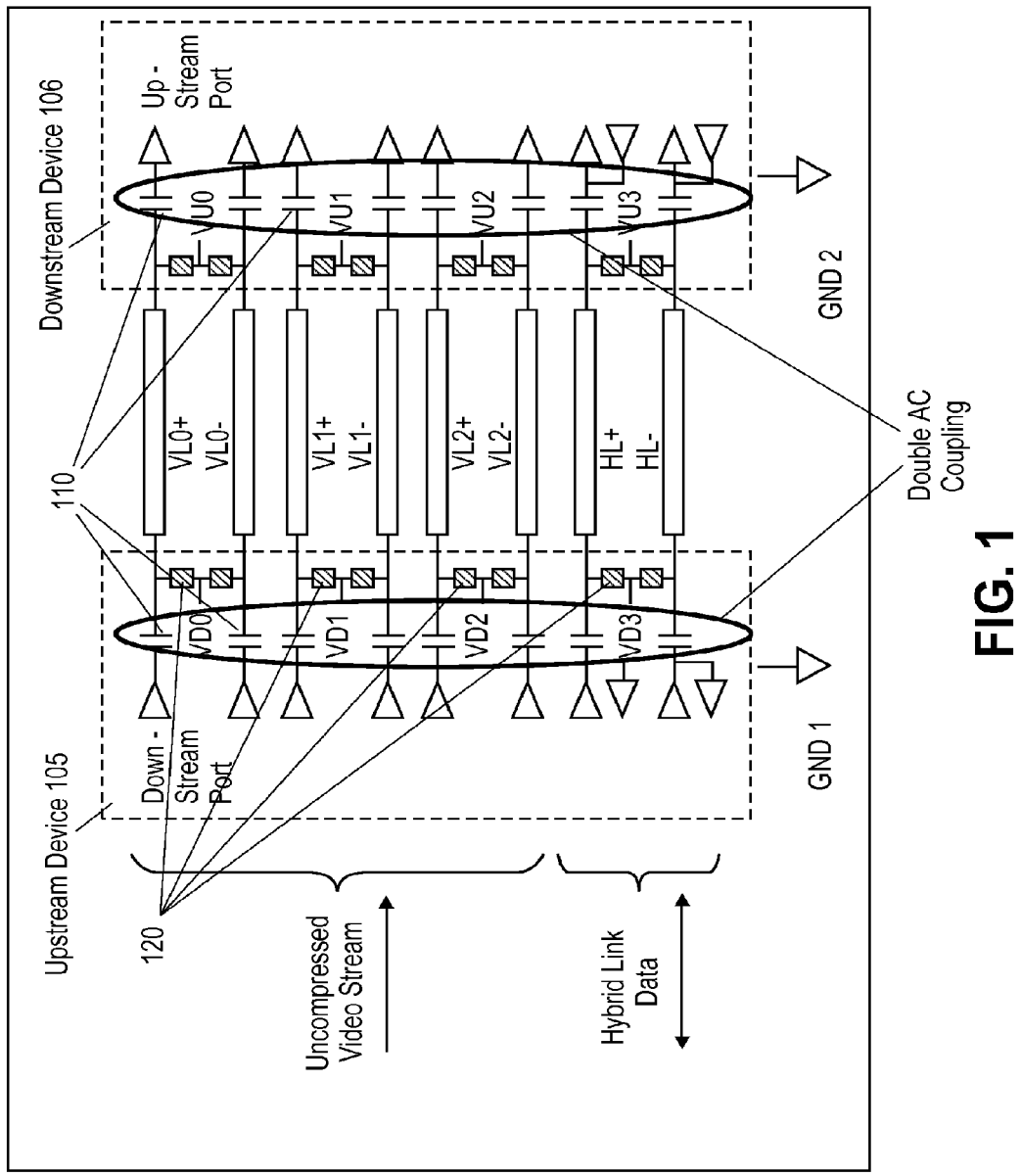
FIG. 1 illustrates power delivery over DiiVA for an upstream device and a downstream device connected through a serial link, in accordance with one embodiment of the present disclosure.

FIG. 1 illustrates power delivery over DiiVA between an upstream device and a downstream device connected through a serial link, in accordance with one embodiment of the present disclosure.

In one embodiment, DiiVA implements serial link technology, i.e. sends information in bit stream format. The physical layer device performs parallel-to-serial conversion, then sends serial bits through a cable, which in one embodiment may be constructed using copper wire. A plurality of devices or nodes are connected through DiiVA in a daisy chain, in which the first device is connected through DiiVA to a second device, the second device is connected through DiiVA to a third device, and so on until the last device, with no loop-backs or webs.

In one embodiment, DiiVA implements differential signaling, using two wires. When sending the bit "1," plus voltage is put on one wire, and minus voltage is put on the other wire, and when sending the bit "0," the polarity is flipped.

In the embodiment illustrated in FIG. 1, an upstream device 105 is connected to a downstream device 106 through a serial link for which a single cable can be used. In one embodiment, the cable may be an Ethernet CAT6 cable.

Other embodiments may use different types of cables, including but not limited to the CAT5 cable and the CAT7 cable.

In the illustrated embodiment, the cable includes four twisted pair wires, or differential pair wires. In the present application, a "differential pair wire" means two copper wires. In FIG. 1, the first pair is shown as VL0+ and VL0−, where VL stands for video link; the second pair is indicated as VL1+ and VL1−; the third pair is shown as VL2+ and VL2−; the fourth pair is shown as HL+ and H−−, where HL stands for hybrid link.

As shown in FIG. 1, the first three differential pair wires (i.e. the first six copper wires, namely VL0+ and VL0−, VL1+ and VL1−, and VL2+ and VL2−) are used to transmit uncompressed video stream data, i.e. for the video links. Three differential pairs are assigned for video data, because the video links require a large bandwidth. The fourth differential pair wire, namely HL+ and HL−, is used for the hybrid link, through which all user data (including but not limited to Ethernet data, USB data, forward audio data, backward audio data, and control data) are transmitted.

Because in the illustrated embodiment DiiVA transmits all data (including but not limited to all video data and user data) with only four twisted pair wires, DiiVA needs only eight connector pins. By using a single cheap and readily available commercial cable (CAT6, as one example), containing only four differential pair wires, to transmit data, cost effectiveness is significantly increased.

While traditional 48 V power delivery uses a transformer for inductance coupling, high speed signals such as the multi-Gpbs signals supported by DiiVA cannot go through a transformer. In the embodiment illustrated in FIG. 1, double AC coupling is used to deliver power over DiiVA, instead of using inductance coupling to couple the incoming signal.

In the illustrated embodiment, a first differential pair (VL0+, VL0−) of the serial link connection is doubly AC coupled using a first HPF (high pass filter) on one side and a second HPF on the other. Examples of HPFs are indicated with reference numeral 110. For clarity, not all the HPFs are labeled with reference numerals. A part of the first differential pair between the first and the second HPFs are connected to a DC voltage source on one side through a first LPF (Low Pass Filter), and to a load on the other side through a second LPF.

In the illustrated embodiment, a second differential pair of the serial link connection is doubly AC coupled with a third HPF on one side and a fourth HPF on the other. A part of the second differential pair between the third and the fourth HPFs are connected to a ground (shown in FIG. 1 as GND 1) on one side through the third LPF and to another ground (shown in FIG. 1 as GND 2) on the other side through the fourth LPF. The DC voltage source supplies a desired amount of current.

The notation VD0, VD1, VD2, VD3 shown in FIG. 1 stands for voltage level, downstream port, for the corresponding differential pairs; the notation VU0, VU1, VU2, and VU3 shown in FIG. 1 stands for voltage level, upstream port, for the corresponding differential pairs.

When both sides of a differential pair wire is doubly AC coupled, as illustrated in FIG. 1 and described above, the medium in-between is in a DC floating state. In the illustrated embodiment, ferrite beads, shown as rectangular elements in FIG. 1, may be used to perform biasing. In this way, DC components of the power may be delivered without undesirably affecting the main high speed signal. Some examples of the ferrite beads are indicated in FIG. 1 with reference numeral 120. For clarity, not all the ferrite beads are labeled with reference numerals.

Figure 2:
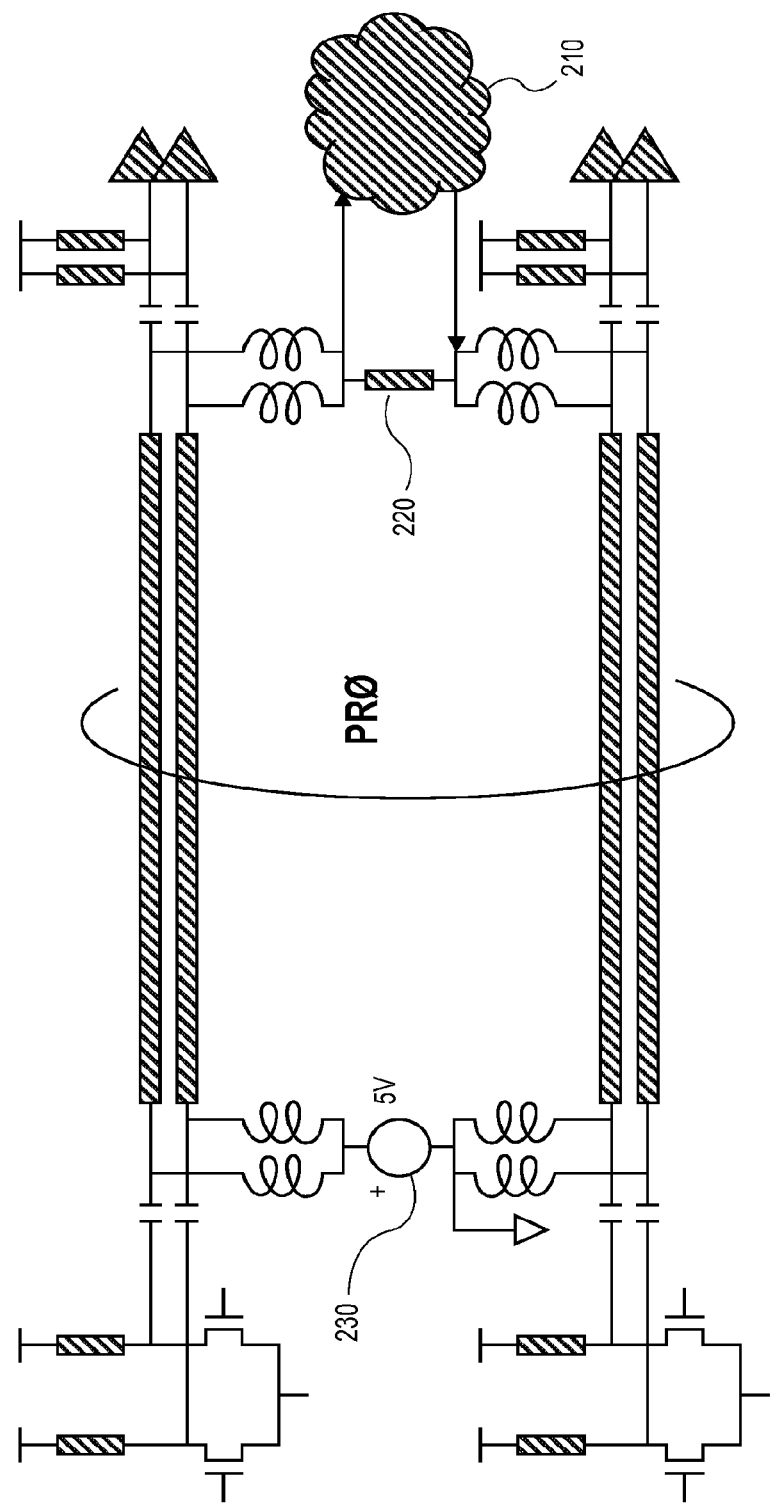
FIG. 2 illustrates the network topology for a power rail assigned to a DiiVA source device, in accordance with one embodiment of the present disclosure.
Figure 3:
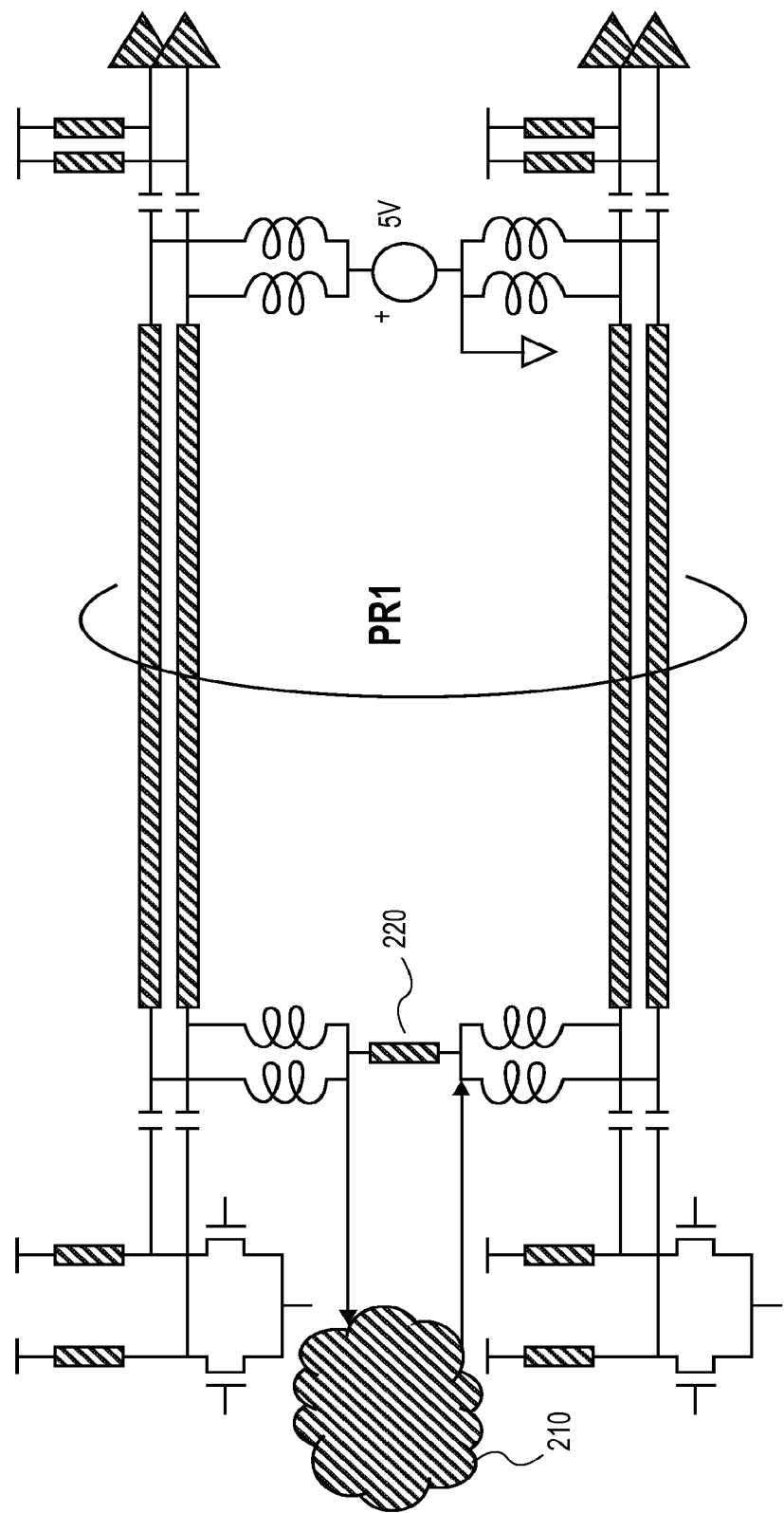
FIG. 3 illustrates the network topology for a power rail assigned to a DiiVA sink device, in accordance with one embodiment of the present disclosure.

FIG. 2 illustrates the network topology for a power rail assigned to a DiiVA source device, in accordance with one embodiment of the present disclosure. FIG. 3 illustrates the network topology for a power rail assigned to a DiiVA sink device, in accordance with one embodiment of the present disclosure. FIGS. 2 and 3 illustrate the same topology, with only the direction reversed.

The power rail shown as PR0 in FIG. 2 corresponds to the differential pairs denoted VL0 and VL1 in FIG. 1. The power rail shown as PR1 in FIG. 3 corresponds to the differential pairs denoted VL2 and HL in FIG. 1. In FIGS. 2 and 3, power is delivered through the upper differential pair in the power rails (PR0 and PR1, respectively) to a circuit 210, and the return or ground current flows to ground through the lower differential pair in the power rails. In the embodiments illustrated in FIGS. 2 and 3, signature resistor 220 is used for detections.

Figure 4:
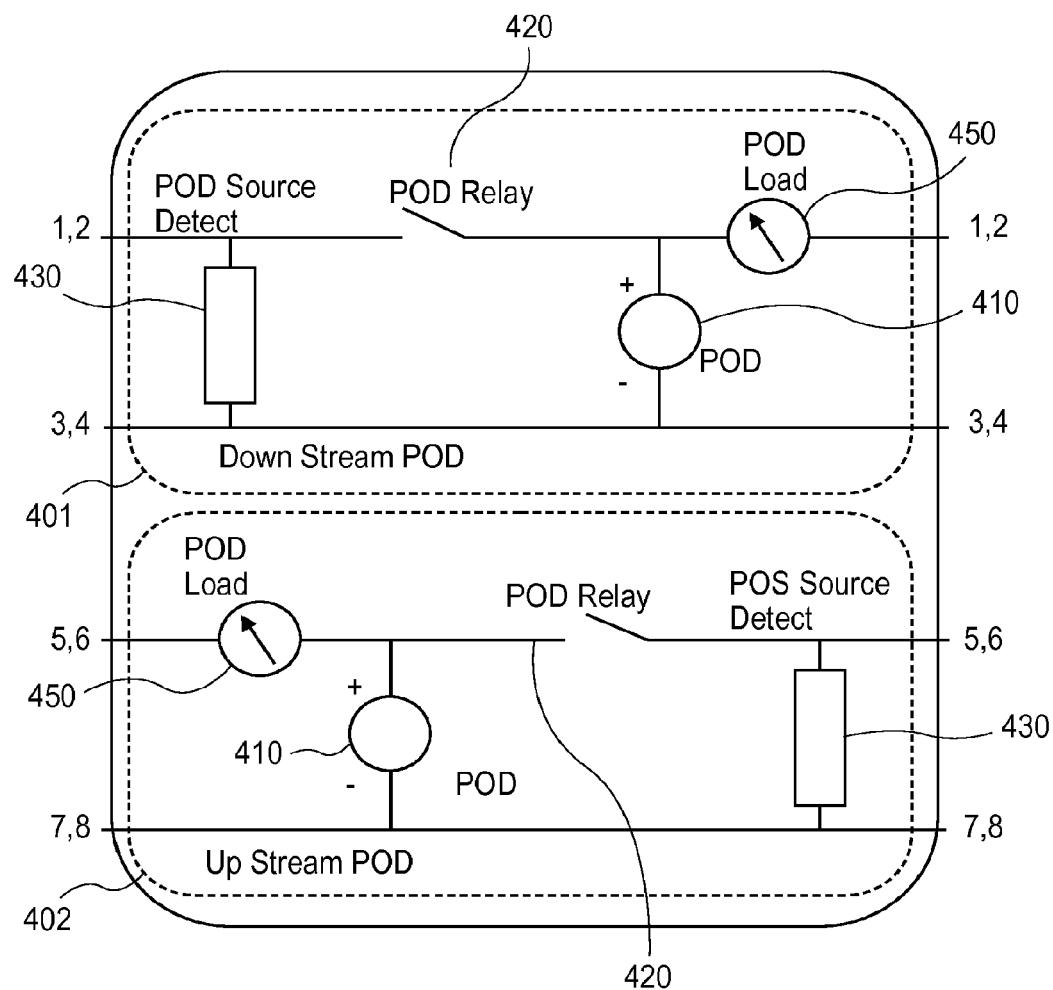
FIG. 4 illustrates an exemplary POD (Power Over DiiVA) circuit, in accordance with one embodiment of the present disclosure.

FIG. 4 is a schematic conceptual diagram of an exemplary POD (Power Over DiiVA) circuit, in accordance with one embodiment of the present disclosure. In one or more embodiments of the present disclosure, each device in the DiiVA network that supports POD contains such a POD circuit. In FIG. 4, both a POD circuit 401 for a downstream power channel (Tx (transmitter) to Rx (receiver)) and a POD circuit 402 for an upstream power channel (Rx to Tx) are illustrated. In one or more embodiments, both the downstream power channel and the upstream power channel may have a power delivery capacity of about 500 mA at about 5 V, over 2 pairs of signals. Other embodiments may have different power delivery capacities.

In some embodiments (not illustrated), the downstream power channel and the upstream power channel may be aggregated to provide more power in the same direction.

In the illustrative POD circuits shown in FIG. 4, the reference numerals 1, 2, 3, 4, 5, 6, 7, and 8 indicate copper wire numbering: "1,2" and "3,4" refer to the first two differential pairs of wires in the serial links connecting the devices in the DiiVA network, while "5,6" and "7,8" refer to the second two differential pairs of wires in the serial links. In the illustrated embodiment, one set of pairs (denoted "1,2" and "3,4") are used to transmit power upstream, while the other set of pairs (denoted "5,6" and "7,8") are used to transmit power downstream. In other embodiments, different arrangements of the wires may be used to transmit power upstream or downstream.

In overview, the downstream POD circuit 401 includes: a voltage source 410 configured to generate a voltage (or equivalently, electric power); a power relay switch 420 configured to relay, when closed, the voltage generated by the voltage source 410 to one or more of the connected devices; a signature resistor 430 connected to the switch 420 and configured for power source detection from one or more of the connected devices; and a load detector 450 connected to the switch 420 and configured to read a load current flowing therethrough so as to detect a load in one of the connected devices, and to extract information about the connected device based on the load current. A controller (not shown) controls the opening and closing of the power relay switch 420. The upstream POD circuit 402 includes the same circuit components arranged in a symmetrically opposite configuration.

The information extracted by the load detector 450 may include without limitation: information regarding the identity of the connected device; information regarding whether the connected device is powered on or powered off; and whether or not the connected device needs a supply of power. The load detector may also detect removal of one of the plurality of devices from the network, and/or connection of a new device to the network.

When a load (typically one or more load resistors) is connected to the POD circuit 401 or 402, the POD load detector 450 detects current flow therethrough, to determine whether a device is connected, and if so, to obtain information about the connected device based on the load resistor value. For example, the POD load detector 450 may receive information from a connected device indicating that the device is self-powered, and thus does not need to be supplied with power. Alternatively, the POD load detector 450 may receive information from a connected device indicating that the device needs to be supplied with power.

The POD circuit illustrated in FIG. 4 can perform a number of functions, including but not limited to: detecting power source from a neighboring device; detecting POD load in a neighboring device; detecting removal of a device and/or connection of a new device; detecting a hot plug; detecting a POD client device; detecting power-on or power-off state of a connected device; and relaying POD power, i.e. relaying POD current from one side to the other.

Figure 5:
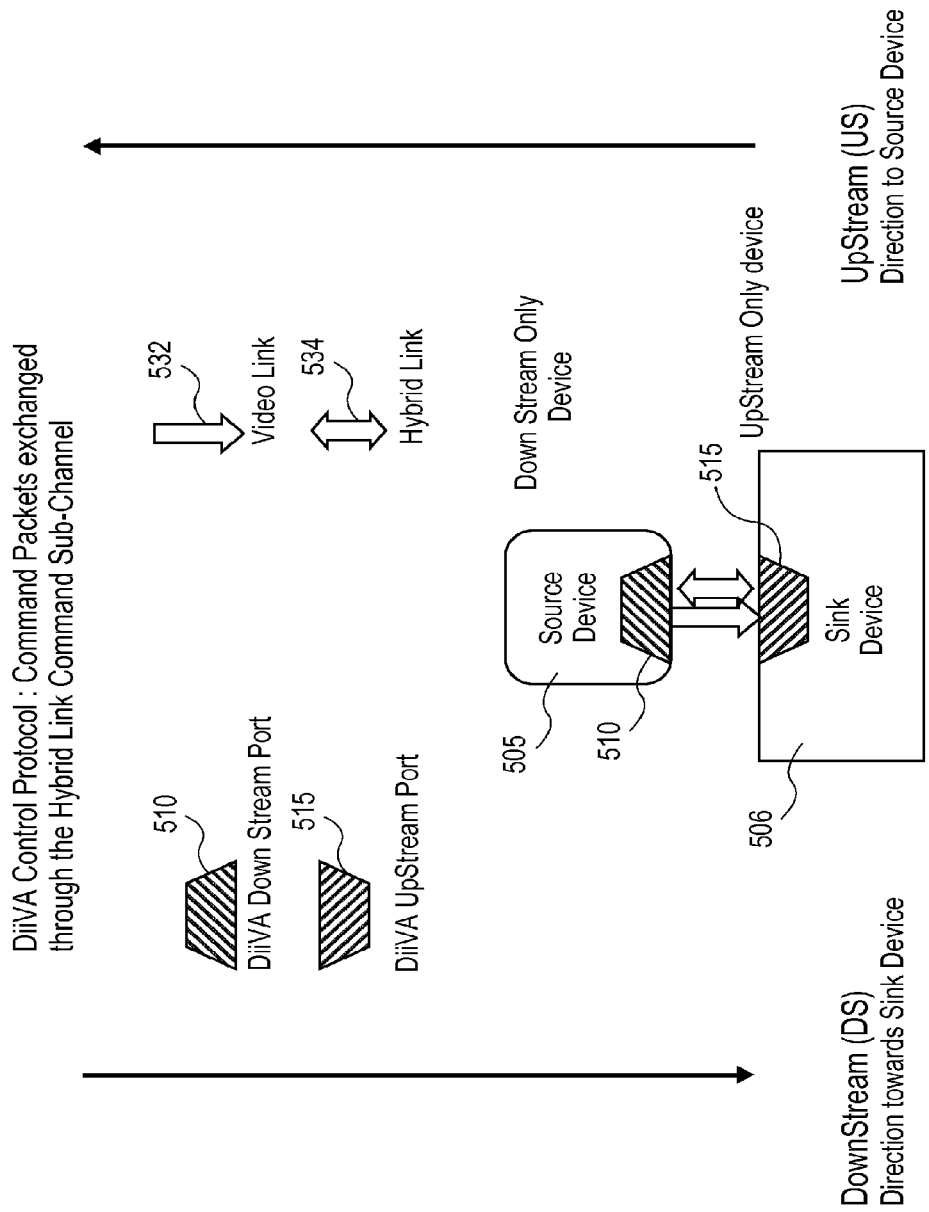
FIG. 5 provides a schematic overview of a DiiVA control protocol, in accordance with one embodiment of the present disclosure.

FIG. 5 provides a schematic overview of a DiiVA control protocol, through which a source device 505 and a sink device (or display device) 506 can exchange command packets can be exchanged through a command sub-channel of a bi-directional hybrid link 534, in accordance with one embodiment of the present disclosure. As seen in FIG. 5, video data are transmitted in one direction only, i.e. downstream from a downstream port 510 in the source device 505 to an upstream port 515 in the sink device 506, through a video link 532.

Data packets are exchanged between the source device 505 and the sink device 506 in both directions through the bi-directional hybrid link 534. The hybrid link 534 thus allows high bandwidth bi-directional data to be transmitted between the source device 505 and the sink device 506 which are connected through a daisy chain. The hybrid link 534 carries data for a number of interfaces in a packetized manner, including without limitation: Forward Audio, Backward Audio, USB Data, Ethernet Data, and Command Channel.

The video link 532 is a point to point interface. In some embodiments, the video link 532 carries uncompressed high definition video data, although it is not limited to carrying only uncompressed video data. The video data is carried over one or more lanes. In DiiVA, there may be 1, 2 or 3 lanes of data. The clock to operate the video link is embedded in the video data from the transmitter. While a unidirectional video link is shown in FIG. 5, other embodiments of the present disclosure may use bi-directional video links.

Figure 6:
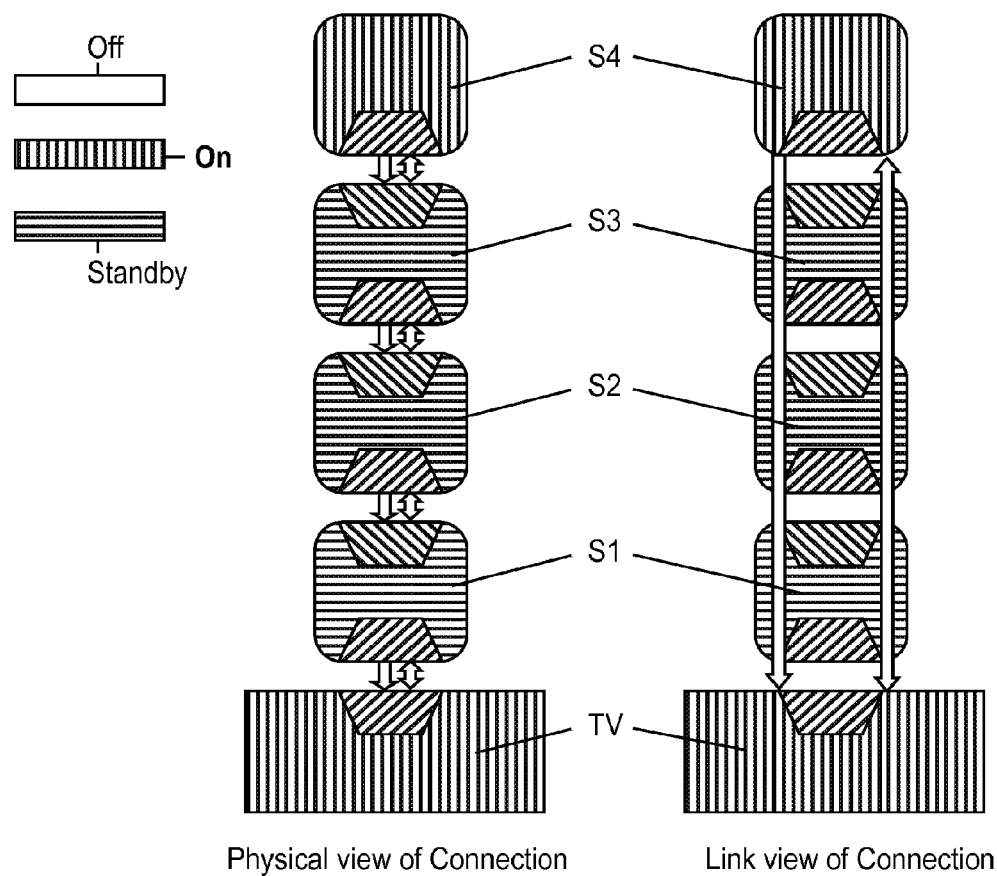
FIG. 6 illustrates a physical view and a link view of the connection between an active source device S4, POD clients S1-S3, and a POD server TV, in accordance with one embodiment of the present disclosure.

FIG. 6 illustrates a physical layer view 610 and a link layer view 620, respectively, of one embodiment of an activation sequence in a daisy chain connection of devices including: an active source device S4, POD clients S1, S2, S3, and a POD server or sink device, which in the illustrate embodiment is a TV.

The physical layer is responsible for physically transmitting and receiving the actual data over the medium. In one or more embodiments, the medium is industry standard Cat-6 cabling, although different types of medium can be used in other embodiments of the present disclosure. The data stream in the physical layer can be encoded in 8b-10b format.

The link layer is responsible for prioritizing and packetizing all forms of data and sending it to the physical layer for transmission. The incoming data from the physical layer is de-packetized and forwarded to appropriate circuits for further processing.

The devices in the daisy chain can operate in an active mode, a POD mode, or an off mode. In the active mode, the device is fully turned on, i.e. locally powered and fully functional. In this mode, all video and hybrid link data are processed on chip using local power.

In the POD mode the video and hybrid link data is processed and serviced by the device. In this mode, the transmitter is able to communicate with the receiver in entirety through the POD mode device. In the off mode, the IC and all of the circuits are turned off. No communication takes place.

In one embodiment, each device in the daisy chain supports a ping pong protocol, through which the device transmits back the data it received, and reverses the direction of the hybrid link, which is half-duplex. Every device connected through DiiVA supports this ping-pong protocol.

In some embodiments, the hybrid link is a point to point half duplex interface, and is designed as a ping-pong or token passing interface. In a ping-pong interface, one device sends a message and then waits for a return message (or an acknowledgement or an idle packet), before sending another message. This operation can be summarized as follows: device A has the right to send and sends a packet; device B receives a packet; device B checks for correctness (no link errors); and device B acknowledges the packet.

In one embodiment, power delivery over DiiVA is performed for a system that includes a source device, a sink device, and at least one client device connected between the source device and the sink device, all devices connected to each other through a daisy chain. The source device is configured to generate and transmit digital video data. The sink device is configured to receive the digital video data from the source device through a video link, and to exchange user data with the source device through a bi-directional hybrid link. In this embodiment, the sink device, when powered on, supplies power to the client device at a level sufficient to allow the client device to enter a mode in which user data can flow through the client device. The sink device supplies power to the source device through the client device so as to permit the source device to be powered on.

Figure 7:
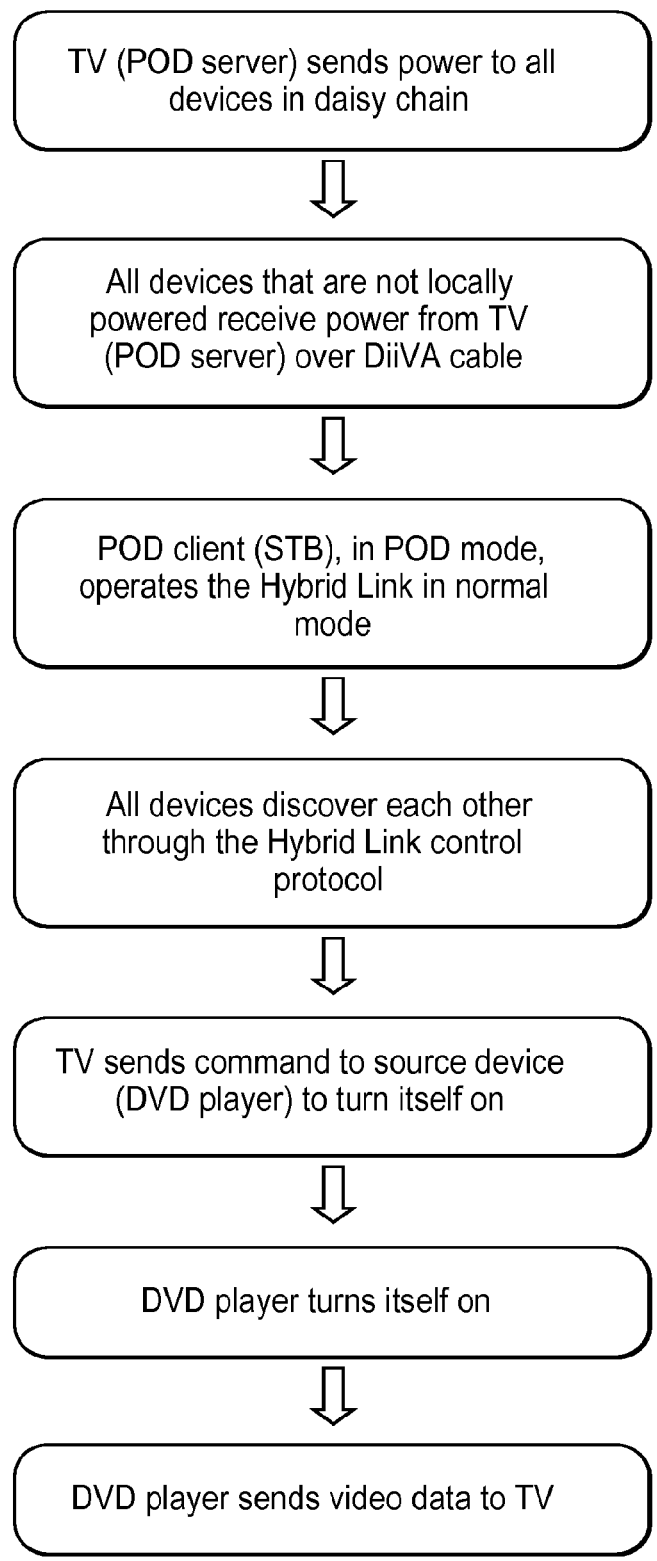
FIG. 7 is a schematic diagram of one example of power delivery over DiiVA in a daisy chain configuration that includes one source device, one POD client, and one sink device.

FIG. 7 schematically illustrates an example of power delivery over DiiVA in a simple daisy chain configuration including one source device (in the example shown in FIG. 7, a DVD player), one POD client (in the example shown in FIG. 7, a set-up box), and one sink device (in the example shown in FIG. 7, a TV). In the illustrated embodiment, the TV first sends power to the devices on the daisy chain. All source devices not locally powered (i.e. 'turned on') receive power from the TV over the DiiVA cable. The TV is POD server and the source devices not locally powered are POD clients. The client(s), in POD mode, operates the hybrid link in normal mode. All the devices discover each other through a hybrid link control protocol. The TV sends a command to the DVD player (source device) to turn itself on. The DVD player turns itself on, leaving the POD client mode, and sends video signals to the TV.

In sum, methods and systems have been described for delivering power over DiiVA. The components, steps, features, objects, benefits and advantages that have been discussed are merely illustrative. None of them, nor the discussions relating to them, are intended to limit the scope of protection in any way. While certain embodiments have been described of systems and methods relating to power delivery over DiiVA, it is to be understood that the concepts implicit in these embodiments may be used in other embodiments as well. Numerous other embodiments are also contemplated, including embodiments that have fewer, additional, and/or different components, steps, features, objects, benefits and advantages. The components and steps may also be arranged and ordered differently. Nothing that has been stated or illustrated is intended to cause a dedication of any component, step, feature, object, benefit, advantage, or equivalent to the public.

In the present disclosure, reference to an element in the singular is not intended to mean "one and only one" unless specifically so stated, but rather "one or more." All structural and functional equivalents to the elements of the various embodiments described throughout this disclosure, known or later come to be known to those of ordinary skill in the art, are expressly incorporated herein by reference.

What is claimed is:

1. A media content system, the system comprising:
   a content source device;
   a content sink device, comprising a voltage source configured to generate a voltage and configurable for receiving media content data from the source device;
   a client device, physically connected with the source device through a first serial communication link and with the sink device through a second serial communication link, wherein the client device is configured to receive power from the sink device through the second serial communication link;
   wherein
      each of the first serial communication link and the second serial communication link comprises a respective first differential pair of wires and a respective second differential pair of wires,
      each of the first and second serial communication links being AC coupled at each respective end thereof through a respective High Pass Filter (HPF) to respective transceiver circuitry, located in each of the content source device, content sink device, and client device; and
      the content sink device is configured to supply the generated voltage via the second serial communication link to the client device, and the client device is configured to pass the generated voltage through to the content source device, and
      the transceiver circuitry in the client device is configurable to operate on power drawn from the content sink device, and
      the client device is configured to receive media content from the source device over the first serial communication link, and signal the received media content over the second serial communication link to the sink device.

2. The media content system of claim 1, wherein the source device is configured to operate according to a protocol in which the source device turns itself on, using power drawn from the sink device, in response to a command from the sink device.

3. The system of claim 1
   wherein the source device and the sink device are configured to exchange user data with each other through a bi-directional hybrid link; and
   wherein the user data comprising one or more of: control data, Ethernet data, USB data, audio data, and bulk data.

4. The system of claim 3, wherein each of the first serial communication link and the second serial communications link further comprise a third differential pair of wires and a fourth differential pair of wires;
   wherein the first, second and third differential pair of wires are used for the video links and are configured to transmit therethrough the video data; and
   wherein the fourth differential pair of wires are used for the bi-directional hybrid link and is configured to transmit therethrough the user data.

5. The system of claim 4,
   wherein the third differential pair of wires is double AC coupled by a HPF on one side and by another HPF on an opposite side; and
   wherein the fourth differential pair of wires is double AC coupled by a HPF on one side and by another HPF on an opposite side.

6. The system of claim 1, wherein the serial communication links are implemented in one of: a CAT5 cable; a CAT6 cable; and a CAT7 cable.

* * * * *